United States Patent
Yi et al.

(10) Patent No.: US 10,817,714 B2
(45) Date of Patent: Oct. 27, 2020

(54) METHOD AND APPARATUS FOR PREDICTING WALKING BEHAVIORS, DATA PROCESSING APPARATUS, AND ELECTRONIC DEVICE

(71) Applicant: BEIJING SENSETIME TECHNOLOGY DEVELOPMENT CO., LTD, Bejing (CN)

(72) Inventors: Shuai Yi, Beijing (CN); Hongsheng Li, Beijing (CN); Xiaogang Wang, Beijing (CN)

(73) Assignee: BEIJING SENSETIME TECHNOLOGY DEVELOPMENT CO., LTD, Beijing (CN)

(*) Notice: Subject to any disclaimer, the term of this patent is extended or adjusted under 35 U.S.C. 154(b) by 112 days.

(21) Appl. No.: 16/174,852

(22) Filed: Oct. 30, 2018

(65) Prior Publication Data

US 2019/0073524 A1   Mar. 7, 2019

Related U.S. Application Data

(63) Continuation of application No. PCT/CN2017/102706, filed on Sep. 21, 2017.

(30) Foreign Application Priority Data

Sep. 29, 2016  (CN) .......................... 2016 1 0868343

(51) Int. Cl.
*G06K 9/00*      (2006.01)
*G06K 9/62*      (2006.01)
(Continued)

(52) U.S. Cl.
CPC ..... *G06K 9/00348* (2013.01); *G06K 9/00771* (2013.01); *G06K 9/4628* (2013.01);
(Continued)

(58) Field of Classification Search
CPC ........... G06K 9/00348; G06K 9/00771; G06K 9/4648; G06K 9/6274; G06K 9/00791;
(Continued)

(56) References Cited

U.S. PATENT DOCUMENTS

| 7,366,325 B2* | 4/2008 | Fujimura | G06K 9/00369 382/104 |
| 2004/0228503 A1* | 11/2004 | Cutler | G06K 9/00348 382/103 |

(Continued)

FOREIGN PATENT DOCUMENTS

| CN | 103907146 A | 7/2014 |
| CN | 104850846 A | 8/2015 |

(Continued)

OTHER PUBLICATIONS

International Search Report in international application No. PCT/CN2017/102706, dated Oct. 31, 2017.

(Continued)

*Primary Examiner* — Jose L Couso
(74) *Attorney, Agent, or Firm* — Syncoda LLC; Feng Ma

(57) ABSTRACT

A method for predicting walking behaviors includes: encoding walking behavior information of at least one target object in a target scene within a historical time period M to obtain a first offset matrix for representing the walking behavior information of the at least one target object within the historical time period M; inputting the first offset matrix into a neural network, and outputting by the neural network a second offset matrix for representing walking behavior information of the at least one target object within a future time period M'; and decoding the second offset matrix to obtain the walking behavior prediction information of the at least one target object within the future time period M'.

20 Claims, 10 Drawing Sheets

(51) Int. Cl.
  *G06K 9/46* (2006.01)
  *G06N 3/08* (2006.01)
  *G06N 3/04* (2006.01)
  *G06N 5/04* (2006.01)
(52) U.S. Cl.
  CPC ......... *G06K 9/6274* (2013.01); *G06N 3/0454* (2013.01); *G06N 3/08* (2013.01); *G06N 5/046* (2013.01); *G06T 2207/20081* (2013.01); *G06T 2207/20084* (2013.01)
(58) Field of Classification Search
  CPC ............ G06K 9/00805; G06K 9/6256; G06K 9/6262; G06K 9/66; G06K 9/00342; G06K 9/00369; G06K 9/00335; G06K 9/00362; G06K 9/00778; G06K 9/00711; G06K 9/00765; G06K 2009/00738; G06T 2207/20081; G06T 2207/20084; G06T 2207/30241; G06T 2207/20076; G06T 2207/30196; G06T 2207/30252; G06T 2207/10016; G06T 1/0007; G06T 7/20; G06T 7/207; G06T 7/215; G06T 7/579; G06N 3/0454; G06N 3/08; G06N 3/084; G06N 3/0472; G06N 3/082; G06N 3/04; G06N 5/046; G06N 5/04; G06N 5/003; G06N 7/005; G06N 20/10; G05D 1/0246; G05D 2201/0213; B60W 2554/00; B60W 2554/4029; G08G 1/166; H04N 5/144; H04N 5/145
  See application file for complete search history.

(56) References Cited

U.S. PATENT DOCUMENTS

| | | | | |
|---|---|---|---|---|
| 2004/0258307 | A1* | 12/2004 | Viola | G06K 9/00369 382/190 |
| 2009/0279738 | A1* | 11/2009 | Sasaki | G06K 9/00369 382/103 |
| 2014/0219504 | A1* | 8/2014 | Haraguchi | G06K 9/00369 382/103 |
| 2014/0219505 | A1 | 8/2014 | Kindo | |
| 2015/0302258 | A1* | 10/2015 | Umezaki | G08G 1/166 382/103 |
| 2016/0364619 | A1* | 12/2016 | Ogata | G06K 9/00362 |
| 2017/0140229 | A1* | 5/2017 | Ogata | B60R 1/00 |

FOREIGN PATENT DOCUMENTS

| | | |
|---|---|---|
| CN | 104915628 A | 9/2015 |
| CN | 105069413 A | 11/2015 |
| CN | 105488794 A | 4/2016 |
| CN | 105740773 A | 7/2016 |
| CN | 105976400 A | 9/2016 |
| CN | 106504266 A | 3/2017 |

OTHER PUBLICATIONS

The Written Opinion of the International Search Authority in international application No. PCT/CN2017/102706, dated Oct. 31, 2017.

Acta Automatica Sinica; vol. 42, No. 6; Jun. 30, 2016; Guan Hao, Xue Xiang-Yang, An Zhi-Yong; "Advances on Application of Deep Learning for Video Object Tracking" pp. 834-847.

Processings of The 32nd International Conference on Machine Learning; Feb. 16, 2015; Nitish Srivastava,Elman Mansimov,Ruslan Salakhutdinov; "Unsupervised Learning of Video Representations using LSTMs" pp. 1-12.

Notification of the First Office Action of Chinese application No. 201610868343.9, dated Sep. 30, 2018.

Pedestrian Behavior Understanding and Prediction with Deep Neural Networks; Shuai Yi, Hongsheng Li, and Xiaogan Wang; Springer International Publishing AG 2016 B. Leibe et al. (Eds.): ECCV 2016, Part I, LNCS 9905, pp. 263-279, 2016. DOI: 10.1007/978-3-319-46448-0 16.

* cited by examiner

METHOD AND APPARATUS FOR PREDICTING WALKING BEHAVIORS, DATA PROCESSING APPARATUS, AND ELECTRONIC DEVICE

CROSS-REFERENCE TO RELATED APPLICATIONS

This is a continuation application of International Patent Application No. PCT/CN2017/102706, filed on Sep. 21, 2017, which claims priority to Chinese Patent Application No. 201610868343.9, filed on Sep. 29, 2016, entitled "METHOD AND DEVICE FOR PREDICTING WALKING BEHAVIORS, DATA PROCESSING DEVICE, AND ELECTRONIC APPARATUS." The disclosures of these applications are incorporated by reference herein in their entirety.

TECHNICAL FIELD

The disclosure relates to computer vision technologies, and in particular, to a method and an apparatus for predicting walking behaviors, a data processing apparatus, and an electronic device.

BACKGROUND

The modeling of pedestrian's walking behaviors is an important issue in the field of computer vision and intelligent video surveillance. Pedestrian's walking behavior models can be importantly applied in many fields, for example, applied to walking behavior prediction, pedestrian detection and tracking, crowd behavior analysis, abnormal behavior detection, etc.

SUMMARY

Embodiments of the disclosure provide a technical solution for predicting pedestrian's walking behaviors.

According to a first aspect of the embodiments of the disclosure, provided is a method for predicting walking behaviors, including:

encoding walking behavior information of at least one target object in a target scene within a historical time period M to obtain a first offset information, the first offset information representing the walking behavior information of the at least one target object within the historical time period M;

inputting the first offset matrix into a neural network, and outputting by the neural network a second offset matrix representing walking behavior information of the at least one target object within a future time period M'; and decoding the second offset matrix to obtain walking behavior prediction information of the at least one target object within the future time period M'.

According to one or more embodiments of the disclosure, the target scene is a scene where a target object for which walking behavior prediction is required is located; the at least one target object includes some or all of the target objects in the target scene; and the at least one target object includes the target object for which walking behavior prediction is required.

According to one or more embodiments of the disclosure, the target object includes a pedestrian.

According to one or more embodiments of the disclosure, the walking behavior information or the walking behavior prediction information includes any one or more of walking path information, walking direction information, and walking speed information.

According to one or more embodiments of the disclosure, the step of encoding walking behavior information of at least one target object in a target scene within a historical time period M to obtain first offset information includes:

obtaining the walking behavior information of each target object in the target scene within the historical time period M respectively;

representing, for the walking behavior information of each target object within the historical time period M, the walking behavior information of the target object within the historical time period M with a displacement vector respectively; and determining a first offset matrix serving as the first offset information according to the displacement vector of each target object.

According to one or more embodiments of the disclosure, the neural network includes a first sub Convolutional Neural Network (CNN), a position-based addition unit, and a second sub CNN;

the step of inputting the first offset information into a neural network and outputting by the neural network second offset information includes:

using the first offset matrix serving as the first offset information as an input of the first sub CNN, and classifying the walking behavior information of the at least one target object within the historical time period M by using the first sub CNN to obtain a walking behavior feature map;

adding a preset position information map of the target scene to the walking behavior feature map by using the position-based addition unit on the basis of a corresponding position to obtain scene walking behavior information, the position information map including position information of a space structure in the target scene; and using the scene walking behavior information as an input of the second sub CNN, determining information about influences of different types of walking behaviors of the at least one target object within the historical time period M on the first offset matrix within the future time period M' by using the second sub CNN respectively, and determining a second offset matrix serving as the second offset information according to the information about influences.

According to one or more embodiments of the disclosure, the position information map of the target scene is predetermined according to information of the space structure of the target scene.

According to one or more embodiments of the disclosure, wherein the first sub CNN includes multiple cascaded CNN layers; each CNN layer in the first sub CNN respectively includes multiple convolution filters; and/or the second sub CNN includes multiple cascaded CNN layers, and each CNN layer in the second sub CNN respectively includes multiple convolution filters.

According to one or more embodiments of the disclosure, wherein the neural network further includes a first pooling unit and a second pooling unit;

the method further includes: after the step of obtaining the walking behavior feature map, performing maximum downsampling on the walking behavior feature map by using the first pooling unit to obtain a new walking behavior feature map, the new walking behavior feature map having a smaller space size than the walking behavior feature map;

the method further includes: after the step of obtaining the second offset matrix, performing convolution up-sampling on the second offset matrix by using the second pooling unit to obtain a second offset matrix having the same size as the first offset matrix.

According to one or more embodiments of the disclosure, the step of decoding the second offset information to obtain walking behavior prediction information of the at least one target object within the future time period M' includes:

decoding the second offset information to obtain displacement vectors representing the walking behaviors of the at least one target object within the future time period M';

obtaining walking behavior information corresponding to the displacement vectors representing the walking behaviors of the at least one target object within the future time period M' respectively; and obtaining prediction information of the walking behaviors of the at least one target object within the future time period M' according to the walking behavior information corresponding to the displacement vectors of the walking behaviors of the at least one target object within the future time period M' respectively.

According to one or more embodiments of the disclosure, performing network training on an initial neural network in advance to obtain the neural network, the initial neural network including: an initial first sub CNN, an initial second sub CNN, an initial first pooling unit, an initial second pooling unit, and an initial position-based addition unit.

According to one or more embodiments of the disclosure, the step of performing network training on an initial neural network in advance to obtain the neural network includes:

performing iterative training on the initial first sub CNN, the initial second sub CNN, the initial first pooling unit, the initial second pooling unit and the initial position-based addition unit in sequence, the interactive training being performed on the next unit when a training result of a current training unit meets a predetermined convergence condition.

According to one or more embodiments of the disclosure, the training result meeting the predetermined convergence condition includes:

when the deviation between an output result of the current training unit and a preset output result is less than a first preset threshold; and/or when the number of iterative trainings performed on the current training unit reaches a second preset threshold.

According to a second aspect of the embodiments of the disclosure, provided is an apparatus for predicting walking behaviors, including:

a behavior encoding unit, configured to encode walking behavior information of at least one target object in a target scene within a historical time period M to obtain a first offset matrix representing the walking behavior information of the at least one target object within the historical time period M;

a neural network, configured to receive the first offset matrix for processing, and output a second offset matrix representing the walking behavior information of the at least one target object within a future time period M'; and a behavior decoding unit, configured to decode the second offset matrix to obtain the walking behavior prediction information of the at least one target object within the future time period M'.

According to one or more embodiments of the disclosure, the walking behavior information or the walking behavior prediction information includes any one or more of walking path information, walking direction information, and walking speed information.

According to one or more embodiments of the disclosure, the behavior encoding unit specifically is configured to:

obtain the walking behavior information of each target object in the target scene within the historical time period M respectively;

represent, for the walking behavior information of each target object within the historical time period M, a walking behavior of the target object within the historical time period M with a displacement vector respectively; and determine a first offset matrix serving as the first offset information according to the displacement vector of each target object.

According to one or more embodiments of the disclosure, the neural network includes:

a first sub CNN, configured to receive the first offset matrix serving as the first offset information, and classify the walking behavior information of the at least one target object within the historical time period M to obtain a walking behavior feature map;

a position-based addition unit, configured to add a preset position information map of the target scene to the walking behavior feature map on the basis of a corresponding position to obtain scene walking behavior information, the position information map including position information of a space structure in the target scene; and a second sub CNN, configured to receive the scene walking behavior information, determine information about influences of different types of walking behaviors of the at least one target object within the historical time period M on the first offset matrix within the future time period M' respectively, and determine a second offset matrix serving as the second offset information according to the information about influences.

According to one or more embodiments of the disclosure, the first sub CNN includes multiple cascaded CNN layers, each CNN layer in the first sub CNN respectively includes multiple convolution filters; and/or the second sub CNN includes multiple cascaded CNN layers; each CNN layer in the second sub CNN respectively includes multiple convolution filters.

According to one or more embodiments of the disclosure, the neural network further includes:

a first pooling unit, configured to perform maximum down-sampling on the walking behavior feature map obtained by the first sub CNN to obtain a new walking behavior feature map having a smaller space size than the walking behavior feature map; and a second pooling unit, configured to perform, after the second sub CNN obtains the second offset matrix, convolution up-sampling on the second offset matrix to obtain a second offset matrix having the same size as the first offset matrix.

According to one or more embodiments of the disclosure, the behavior encoding unit is specifically configured to:

decode the second offset information to obtain displacement vectors representing the walking behaviors of the at least one target object within the future time period M';

obtain walking behavior information corresponding to the displacement vectors of the walking behaviors of the at least one target object within the future time period M' respectively; and obtain walking behavior prediction information of the at least one target object within the future time period M' according to the walking behavior information corresponding to the displacement vectors of the walking behaviors of the at least one target object within the future time period M' respectively.

According to one or more embodiments of the disclosure, the apparatus further includes:

a network training unit, configured to perform network training on an initial neural network to obtain the neural network, the initial neural network including: an initial first sub CNN, an initial second sub CNN, an initial first pooling unit, an initial second pooling unit, and an initial position-based addition unit.

According to one or more embodiments of the disclosure, wherein the network training unit is specifically configured to:

perform iterative training on the initial first sub CNN, the initial second sub CNN, the initial first pooling unit, the initial second pooling unit, and the initial position-based addition unit in sequence, the interactive training being performed on the next unit when the training result of a current training unit meets a predetermined convergence condition.

According to a third aspect of the embodiments of the disclosure, provided is a method for predicting walking behaviors, including:

capturing at least one or more images of at least one target object in a target scene to obtain walking behavior information of the at least one target object;

encoding the walking behavior information within a historical time period M to obtain first offset information, the first offset information representing the walking behavior information of the at least one target object within the historical time period M;

inputting the first offset information into a neural network, and outputting by the neural network second offset information representing walking behavior information of the at least one target object within a future time period M'; and decoding the second offset information to obtain walking behavior prediction information of the at least one target object within the future time period M';

outputting predicted position information of the at least one target object based on the walking behavior prediction information.

According to one or more embodiments of the disclosure, the walking behavior information or the walking behavior prediction information includes any one or more of walking path information, walking direction information, and walking speed information.

According to one or more embodiments of the disclosure, the step of encoding walking behavior information of at least one target object in a target scene within a historical time period M to obtain first offset information includes:

obtaining the walking behavior information of each target object in the target scene within the historical time period M respectively;

representing, for the walking behavior information of each target object within the historical time period M, the walking behavior information of the target object within the historical time period M with a displacement vector respectively; and determining a first offset matrix serving as the first offset information according to the displacement vector of each target object.

According to one or more embodiments of the disclosure, the neural network includes a first sub Convolutional Neural Network (CNN), a position-based addition unit, and a second sub CNN;

the step of inputting the first offset information into a neural network and outputting by the neural network second offset information includes:

using the first offset matrix serving as the first offset information as an input of the first sub CNN, and classifying the walking behavior information of the at least one target object within the historical time period M by using the first sub CNN to obtain a walking behavior feature map;

adding a preset position information map of the target scene to the walking behavior feature map by using the position-based addition unit on the basis of a corresponding position to obtain scene walking behavior information, the position information map including position information of a space structure in the target scene; and using the scene walking behavior information as an input of the second sub CNN, determining information about influences of different types of walking behaviors of the at least one target object within the historical time period M on the first offset matrix within the future time period M' by using the second sub CNN respectively, and determining a second offset matrix serving as the second offset information according to the information about influences.

According to one or more embodiments of the disclosure, the position information map of the target scene is pre-determined according to information of the space structure of the target scene.

According to one or more embodiments of the disclosure, the first sub CNN includes multiple cascaded CNN layers; each CNN layer in the first sub CNN respectively includes multiple convolution filters; and/or the second sub CNN includes multiple cascaded CNN layers, and each CNN layer in the second sub CNN respectively includes multiple convolution filters.

According to one or more embodiments of the disclosure, the neural network further includes a first pooling unit and a second pooling unit;

the method further includes: after the step of obtaining the walking behavior feature map, performing maximum down-sampling on the walking behavior feature map by using the first pooling unit to obtain a new walking behavior feature map, the new walking behavior feature map having a smaller space size than the walking behavior feature map;

the method further includes: after the step of obtaining the second offset matrix, performing convolution up-sampling on the second offset matrix by using the second pooling unit to obtain a second offset matrix having the same size as the first offset matrix.

According to one or more embodiments of the disclosure, the step of decoding the second offset information to obtain walking behavior prediction information of the at least one target object within the future time period M' includes:

decoding the second offset information to obtain displacement vectors representing the walking behaviors of the at least one target object within the future time period M';

obtaining walking behavior information corresponding to the displacement vectors representing the walking behaviors of the at least one target object within the future time period M' respectively; and obtaining prediction information of the walking behaviors of the at least one target object within the future time period M' according to the walking behavior information corresponding to the displacement vectors of the walking behaviors of the at least one target object within the future time period M' respectively.

According to one or more embodiments of the disclosure, performing network training on an initial neural network in advance to obtain the neural network, the initial neural network including: an initial first sub CNN, an initial second sub CNN, an initial first pooling unit, an initial second pooling unit, and an initial position-based addition unit.

According to one or more embodiments of the disclosure, the step of performing network training on an initial neural network in advance to obtain the neural network includes:

performing iterative training on the initial first sub CNN, the initial second sub CNN, the initial first pooling unit, the initial second pooling unit and the initial position-based addition unit in sequence, the interactive training being performed on the next unit when a training result of a current training unit meets a predetermined convergence condition.

According to a fourth aspect of the embodiments of the disclosure, provided is an apparatus for predicting walking behaviors, including:

a processor;

a memory having stored instructions and a neural network, the instructions when executed by the processor, cause the processor to perform operations, the operations including:

capturing at least one or more images of at least one target object in a target scene to obtain walking behavior information of the at least one target object;

encoding walking behavior information of at least one target object in a target scene within a historical time period M to obtain first offset information representing the walking behavior information of the at least one target object within the historical time period M;

inputting the first offset information into the neural network and outputting by the neural network second offset information representing the walking behavior information of the at least one target object within a future time period M';

decoding the second offset information to obtain walking behavior prediction information of the at least one target object within the future time period M'; and outputting predicted position information of the at least one target object based on the walking behavior prediction information.

According to one or more embodiments of the disclosure, the walking behavior information or the walking behavior prediction information includes any one or more of walking path information, walking direction information, and walking speed information.

According to one or more embodiments of the disclosure, the operation of encoding walking behavior information of at least one target object in a target scene within a historical time period M to obtain first offset information includes:

obtaining the walking behavior information of each target object in the target scene within the historical time period M respectively;

representing, for the walking behavior information of each target object within the historical time period M, the walking behavior information of the target object within the historical time period M with a displacement vector respectively; and determining a first offset matrix serving as the first offset information according to the displacement vector of each target object.

According to one or more embodiments of the disclosure, the neural network includes:

a first sub CNN, configured to receive the first offset matrix serving as the first offset information, and classify the walking behavior information of the at least one target object within the historical time period M to obtain a walking behavior feature map;

a position-based addition unit, configured to add a preset position information map of the target scene to the walking behavior feature map on the basis of a corresponding position to obtain scene walking behavior information, the position information map including position information of a space structure in the target scene; and a second sub CNN, configured to receive the scene walking behavior information, determine information about influences of different types of walking behaviors of the at least one target object within the historical time period M on the first offset matrix within the future time period M' respectively, and determine a second offset matrix serving as the second offset information according to the information about influences.

According to one or more embodiments of the disclosure, the first sub CNN includes multiple cascaded CNN layers, each CNN layer in the first sub CNN respectively includes multiple convolution filters; and/or the second sub CNN includes multiple cascaded CNN layers; each CNN layer in the second sub CNN respectively includes multiple convolution filters.

According to one or more embodiments of the disclosure, the neural network further includes:

a first pooling unit, configured to perform maximum down-sampling on the walking behavior feature map obtained by the first sub CNN to obtain a new walking behavior feature map having a smaller space size than the walking behavior feature map; and a second pooling unit, configured to perform, after the second sub CNN obtains the second offset matrix, convolution up-sampling on the second offset matrix to obtain a second offset matrix having the same size as the first offset matrix.

According to one or more embodiments of the disclosure, the operation of decoding the second offset information to obtain walking behavior prediction information of the at least one target object within the future time period M' includes:

decoding the second offset information to obtain displacement vectors representing the walking behaviors of the at least one target object within the future time period M';

obtaining walking behavior information corresponding to the displacement vectors representing the walking behaviors of the at least one target object within the future time period M' respectively; and obtaining prediction information of the walking behaviors of the at least one target object within the future time period M' according to the walking behavior information corresponding to the displacement vectors of the walking behaviors of the at least one target object within the future time period M' respectively.

According to one or more embodiments of the disclosure, the operations further including:

performing network training on an initial neural network in advance to obtain the neural network, the initial neural network including: an initial first sub CNN, an initial second sub CNN, an initial first pooling unit, an initial second pooling unit, and an initial position-based addition unit.

According to one or more embodiments of the disclosure, the operation of performing network training on an initial neural network in advance to obtain the neural network includes:

performing iterative training on the initial first sub CNN, the initial second sub CNN, the initial first pooling unit, the initial second pooling unit and the initial position-based addition unit in sequence, the interactive training being performed on the next unit when a training result of a current training unit meets a predetermined convergence condition.

According to a fifth aspect of the embodiments of the disclosure, provided is a non-transitory computer-readable storage medium having stored thereon instructions executable by a processor, wherein the instructions, when being executed, are configured to:

capture at least one or more images of at least one target object in a target scene to obtain walking behavior information of the at least one target object;

encode walking behavior information of at least one target object in a target scene within a historical time period M to obtain first offset information, the first offset information representing the walking behavior information of the at least one target object within the historical time period M;

input the first offset information into a neural network, and outputting by the neural network second offset information representing walking behavior information of the at least one target object within a future time period M';

decode the second offset information to obtain walking behavior prediction information of the at least one target object within the future time period M'; and output predicted position information of the at least one target object based on the walking behavior prediction information.

According to a sixth aspect of the embodiments of the disclosure, provided is a data processing apparatus, including an apparatus for predicting walking behaviors.

According to one or more embodiments of the disclosure, the data processing apparatus includes an Advanced RISC Machine (ARM), a Central Processing Unit (CPU), or a Graphics Processing Unit (GPU).

According to a seventh aspect of the embodiments of the disclosure, provided is an electronic device, including the data processing apparatus described in the embodiments above.

According to an eighth aspect of the embodiments of the disclosure, provided is a computer storage medium for storing computer-readable instructions.

The instructions include:

an instruction for encoding walking behavior information of at least one target object in a target scene within a historical time period M to obtain a first offset matrix representing the walking behavior information of the at least one target object within the historical time period M;

an instruction for inputting the first offset matrix into a neural network, and outputting by the neural network a second offset matrix representing walking behavior information of the at least one target object within a future time period M'; and an instruction for decoding the second offset matrix to obtain walking behavior prediction information of the at least one target object within the future time period M'.

According to a ninth aspect of the embodiments of the disclosure, provided is a computer device, including: a memory for storing executable instructions; and one or more processors communicating with the memory to execute the executable instructions, so as to complete operations corresponding to the method for predicting walking behaviors in any one of the embodiments of the disclosure above.

According to a tenth aspect of the embodiments of the disclosure, provided is a computer program, including: computer-readable codes, wherein when the computer-readable codes run in a device, a processor in the device executes executable instructions for implementing the steps of the method for predicting walking behaviors according to the above embodiments.

On the basis of the method and apparatus for predicting walking behaviors, the data processing apparatus, the electronic device, the computer storage medium and the computer device provided by the embodiments of the disclosure above, a deep learning-based method is proposed, including: encoding walking behaviors of at least one target object in a target scene within a historical time period M to obtain a first offset matrix representing the walking behaviors of the at least one target object within the historical time period M, and inputting the first offset matrix into a neural network to obtain a second offset matrix representing walking behaviors of the at least one target object within a future time period M'; and decoding the second offset matrix to obtain the walking behaviors of the at least one target object within the future time period M'.

The embodiments of the disclosure consider the influences of walking behaviors of target objects within a past period of time on the walking behaviors thereof within a future period of time. Because the walking behaviors of the target objects in the same scene may have influence on each other, the embodiments of the disclosure also consider the influences of the walking behaviors of other possible target objects (such as, pedestrians) in the same scene on the walking behaviors of a particular target object (such as, a current pedestrian for which prediction of future walking behaviors is required), so that the factors possibly having influences on the future walking behaviors of the particular target object can be simultaneously considered, and the walking behaviors of the target object within the future period of time can be more accurately and reliably predicted. In addition, according to the embodiments of the disclosure, the walking behaviors of at least one target object in a scene can be simultaneously analyzed, future walking trajectory prediction results of the at least one target object are given all at once, and the walking behavior prediction is not limited only to a single target object, and therefore, the prediction efficiency is high.

The technical solution of the disclosure will be further described below in detail with reference to the accompanying drawings and embodiments.

BRIEF DESCRIPTION OF THE DRAWINGS

The accompanying drawings, which form part of the specification, depict embodiments of the disclosure and, together with the description, serve to illustrate the principles of the disclosure.

The disclosure will be more clearly understood by reference to the accompanying drawings in conjunction with following detailed description, wherein.

DETAILED DESCRIPTION

Figure 1:
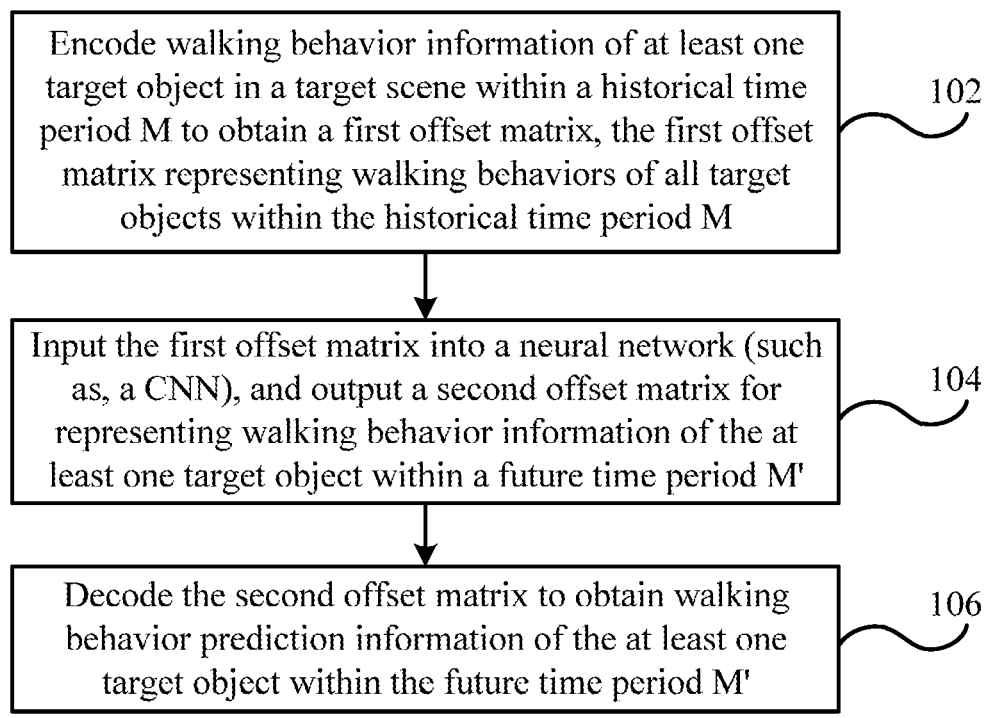
FIG. 1 illustrates a flow chart of an embodiment of a method for predicting walking behaviors according to the disclosure.

Various exemplary embodiments of the disclosure will now be described in detail with reference to the accompanying drawings. It should be notated that: unless otherwise specified, the relative arrangement, numeric expressions and values of components and steps set forth in these embodiments are not intended to limit the scope of the disclosure.

Meanwhile, it should be understood that, to facilitate description, the size of each part illustrated in the accompanying drawings is not drawn in accordance with the actual proportional relation.

The following description of at least one exemplary embodiment is actually only illustrative, and is not intended to limit the disclosure and its application or use under no circumstances.

Technologies, methods, and devices known to persons skilled in the art may not be discussed in detail, but shall be regarded as a part of the specification in proper cases.

It should be noted that: similar reference numerals and letters show similar items in the accompanying drawings below. As a result, once an item is defined in an accompanying drawing, then it is not necessary to further discuss the item in subsequent accompanying drawings.

Embodiments of the disclosure may be applied to a computer system/server, which may be operated together with numerous other general-purpose or special-purpose computing system environments or configurations. Examples of well-known computing systems, environments, and/or configurations suitable for use with the computer system/server include, but not limited to: personal computer systems, server computer systems, thin clients, thick clients, handheld or laptop devices, microprocessor-based systems, set-top boxes, programmable consumer electronics, network personal computers, minicomputer systems, mainframe computer systems, distributed computing technology environments including any of the above systems, and the like.

The computer system/server may be described in a general context of computer system-executable instructions (such as program modules) executed by a computer system. Generally, the program modules may include routines, programs, target programs, components, logic, data structures, and the like, which execute particular tasks or implement particular abstract data types. The computer system/server may also be implemented in distributed cloud computing environments where tasks are executed by remote processing devices that are linked through a communication network. In a distributed cloud computing environment, the program modules may be located in local or remote computer system storage media including storage devices.

According to one or more embodiments of the disclosure, an offset matrix is used as an example of offset information. Of course, it should be appreciated the offset information is not limited to the offset matrix, other forms of offset information is also applicable.

FIG. 1 is a flow chart of an embodiment of a method for predicting walking behaviors according to the disclosure. As shown in FIG. 1, the method for predicting walking behaviors in the embodiment includes:

102. Encode walking behavior information of at least one target object in a target scene within a historical time period M to obtain a first offset matrix representing walking behaviors of the at least one target object within the historical time period M.

The target scene is a scene where a target object for which walking behavior prediction is required is located, such as a station and a factory.

As a specific example rather than a limitation of each embodiment of the disclosure, the target objects in each embodiment of the disclosure specifically are pedestrians, and may also be all other objects or animals for which walking behavior prediction is required, such as, commodity transferring apparatuses (such as, robots) in e-commerce warehouses and automatic driving vehicles.

104. Input the first offset matrix into a deep neural network (for example, may be, but not limited to, a Convolutional Neural Network (CNN)), so that the deep neural network processes the first offset matrix to output a second offset matrix representing the walking behavior information of the at least one target object within a future time period M'.

106. Decode the second offset matrix to obtain walking behavior prediction information of the at least one target object within the future time period M'.

On the basis of the method for predicting walking behaviors provided by the embodiment of the disclosure above, a deep learning-based method is proposed, including: encoding walking behaviors of at least one target object in a target scene within a historical time period M to obtain a first offset matrix representing the walking behaviors of the at least one target object within the historical time period M, and inputting the first offset matrix into a neural network (such as, a CNN) to obtain a second offset matrix representing walking behaviors of the at least one target object within a future time period M'; and decoding the second offset matrix to obtain the walking behaviors of the at least one target object within the future time period M'. The embodiments of the disclosure consider the influences of walking behaviors of target objects within a past period of time on the walking behaviors thereof within a future period of time. Because the walking behaviors of the target objects in the same scene may have influences on each other, the embodiments of the disclosure also consider the influences of the walking behaviors of other possible target objects (such as, pedestrians) in the same scene on the walking behaviors of a particular target object (such as, a current pedestrian needing prediction of future walking behaviors), so that the factors possibly having influences on the future walking behaviors of the particular target object can be simultaneously considered, and the walking behaviors of the target object within the future period of time can be more accurately and reliably predicted. In addition, according to the embodiments of the disclosure, the walking behaviors of at least one target object in a scene can be simultaneously analyzed, future walking trajectory prediction results of the at least one target object are given all at once, and therefore, the prediction efficiency is high.

In another specific example of the embodiment of the method for predicting walking behaviors according to the disclosure, the at least one target object includes a target object for which walking behavior prediction is required. The target object for which walking behavior prediction is required may specifically be one or more. That is, according to the embodiments of the disclosure, the walking behaviors of multiple target objects within the future time period M' can be simultaneously predicted, walking behavior prediction tasks for the multiple target objects can be completed all at once without respectively predicting the walking behaviors of the multiple target objects within future time period M' multiple times, and therefore, the prediction efficiency is high.

In addition, the at least one target object may include a part of or all of the target objects in the target scene. When the at least one target object includes all target objects in the target scene, the influences of the walking behaviors of all other target objects (such as pedestrians) in the same scene on the walking behaviors of a particular target object (such as a current pedestrian for which prediction of future walking behaviors is required) are simultaneously considered, and all the target objects in the scene are simultaneously predicted, so that the factors possibly having influences on the future walking behaviors of the particular target object can be simultaneously considered, and the walking behaviors of the target object within the future period of time can be more accurately and reliably predicted. Moreover, the walking behavior prediction tasks for all the target objects can be completed all at once, so as to comprehensively predict possible walking behaviors of each target object in the target scene within the future time period M'. As another specific example of the embodiment of the method for predicting walking behaviors according to the disclosure, the walking behavior information or walking behavior prediction information may, for example, include, but not limited to, any one or more of walking path information, walking direction information, and walking speed information. The walking behavior information encoded in operation 102 may be the same as or different from the walking behavior prediction information obtained by decoding in operation 106. For example, the walking behavior information encoded in operation 102 may be the walking path information, while the walking behavior prediction information obtained by decoding in operation 106 may be the walking path information, and may also be the walking direction information or the walking speed information. That is, on the basis of the embodiments of the disclosure, the walking path information, the walking direction information and/or the walking speed information of each target object in the target scene in the future time period M' may be predicted by means of the walking behavior information of each target object in the target scene in the historical time period M. In the following embodiments of the disclosure, description is made by taking the walking behavior information encoded in operation 102 and the walking behavior prediction information obtained by decoding in operation 106 being the walking path information as an example, because all the target objects in the target scene include the at least one target object, the walking path information may be collected per unit of time and includes direction information. On the basis of the description of the embodiments of the disclosure, persons skilled in the art can know that when the walking behavior information encoded in operation 102 and the walking behavior prediction information obtained by decoding in operation 106 are the walking direction information or the walking speed information, the embodiments of the disclosure are also applicable.

Figure 2:
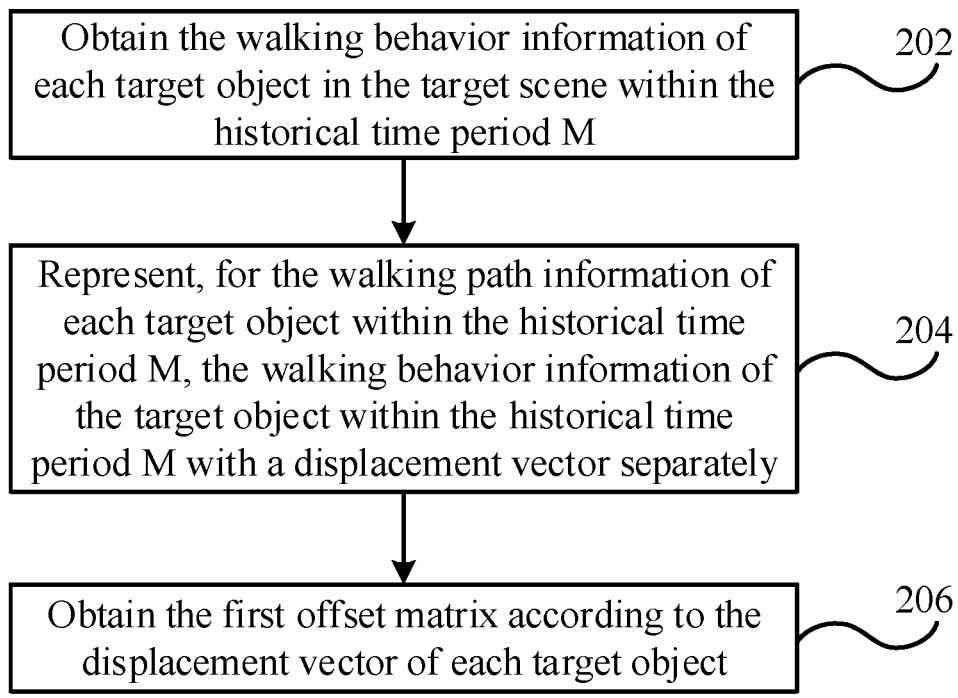
FIG. 2 illustrates a flow chart of an embodiment of obtaining a first offset matrix according to the embodiment of the disclosure.

On the basis of the walking path information, the walking direction information, and the walking speed information of the target object within the future time period M' obtained in the embodiments of the disclosure, the walking trajectory and information, such as walking speeds at different moments and when to turn, of each target object in the target scene can be acquired. FIG. 2 is a flow chart of an embodiment of obtaining a first offset matrix according to the embodiment of the disclosure. As shown in FIG. 2, as an example of the embodiment of the method for predicting walking behaviors according to the disclosure, operation 102 may specifically be implemented as follows:

202. Obtain the walking path information of each target object in the target scene within the historical time period M.

204. Represent, for the walking path information of each target object within the historical time period M, the walking behavior information of the target object within the historical time period M with a displacement vector respectively, and assign the value of the displacement vector to the current position of the target object.

206. Determine a first offset matrix according to the displacement vector of each target object.

For example, the displacement vectors of all the target objects are synthesized to obtain the first offset matrix.

In another embodiment of the disclosure, the position of a target object is assigned with the value of a displacement vector of the target object. To distinguish a position where a target object is present from a position where no target object is present (i.e., the background in the target scene) in a target scene, all elements in all displacement vectors can be selectively added by 1 to ensure that the elements of all the displacement vectors are greater than 0, so as to distinguish the target object from the background in the target scene, thereby facilitating subsequently recognizing target objects from the target scene.

In another specific example of the embodiment of the method for predicting walking behaviors according to the disclosure, the neural network for processing the first offset matrix may specifically include a first sub CNN, a position-based addition unit, and a second sub CNN.

Figure 3:
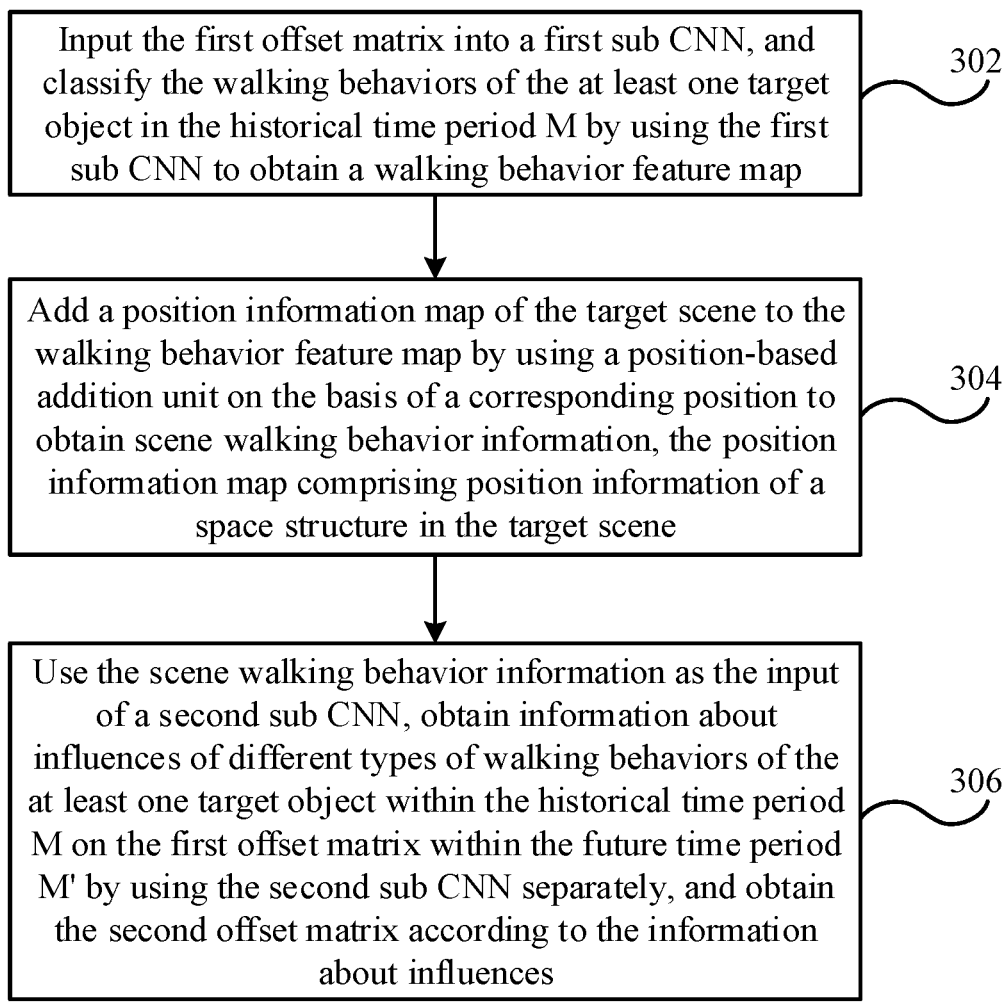
FIG. 3 illustrates a flow chart of an embodiment of obtaining a second offset matrix according to the embodiment of the disclosure.

FIG. 3 is a flow chart of an embodiment of obtaining a second offset matrix according to the embodiment of the disclosure. As shown in FIG. 3, as an example of the embodiment of the method for predicting walking behaviors according to the disclosure, operation 104 may specifically be implemented as follows:

302. Use the first offset matrix as the input of the first sub CNN, and classify the walking behaviors of the at least one target object in the historical time period M by using the first sub CNN to obtain a walking behavior feature map.

304. Add a preset position information map of the target scene to the walking behavior feature map by using the position-based addition unit to obtain scene walking behavior information.

The position information map includes position information of a space structure in the target scene. The space structure here may specifically be a space structure having influences on the walking behaviors of the target objects in the target scene, for example, position information of an entrance and an exit of the target scene and position information of obstacles in the target scene, and may also be all space structures in the target scene. The position information map is obtained based on the training of a target scene sample.

By adding the position information map of the target scene to the walking behavior feature map on the basis of a corresponding position, the obtained scene walking behavior information includes the position information of the entire target scene, so that the influences of each specific scene in the target scene on the walking behaviors of the target object are considered.

306. Use the scene walking behavior information as the input of the second sub CNN, obtain information about influences of different types of walking behaviors of the at least one target object within the historical time period M on the first offset matrix within the future time period M' by using the second sub CNN respectively, and determine a second offset matrix according to the information, for example, synthesize the information about influences of the different types of walking behaviors of the at least one target object within the historical time period M on the first offset matrix within the future time period M' to obtain the second offset matrix.

In a further embodiment based on the embodiment shown in FIG. 3, an operation of modeling the space structure information of the target scene in advance to obtain the position information map of the target scene may further be included.

In a further specific example based on the embodiment of the method for predicting walking behaviors according to the disclosure, the first sub CNN may specifically include multiple cascaded CNN layers, e.g., three CNN layers, each CNN layer in the three CNN layers of the first sub CNN may respectively include multiple convolution filters, e.g., 64 convolution filters, and the size of each convolution filter may be 3*3; and/or, the second sub CNN may also specifically include multiple CNN layers, e.g., three CNN layers. Each CNN layer in the multiple CNN layers of the second sub CNN may also respectively include multiple convolution filters, e.g., 64 convolution filters, and the size of each convolution filter may be 3*3.

Exemplarily, a bottom CNN layer in the first sub CNN can roughly divide the walking behaviors of the at least one target object, for example, divide them into target objects walking up and walking down; a secondary bottom CNN layer can further divide the rough division results of the bottom CNN layer, for example, divide them into target objects walking up and to the left, walking exactly upward, and walking up and to the right; an upper CNN layer can screen out the walking behaviors having different properties, such as, fast-running pedestrians and fast-turning pedestrians. In the first sub CNN, the closer to the top layer, the more specific the walking behaviors screened by the CNN layer are.

The second sub CNN can further arrange and integrate the classification results of the first sub CNN, i.e., integrate the influences of the target objects for which walking behavior prediction is required in the target objects having different types of walking behaviors. Each CNN layer in the second sub CNN performs information fusion according to each subtype of walking behaviors. The closer to the top layer, the higher the degree of fusion is. For example, the bottom CNN layer in the second sub CNN may synthesize the influences of all the target objects walking up and to the left, the secondary bottom CNN layer may synthesize the influences of all the target objects walking up and to the left, walking up and to the right, and walking exactly upward, and the upper CNN layer may synthesize the walking behaviors of all the target objects in the target scene to obtain the output result of the second sub CNN.

That is, the CNN layers in the first sub CNN and the CNN layers in the second sub CNN finely classify the walking behaviors of all the target objects step by step, and then integrate the walking behaviors together step by step.

The more complicated the network structure of the neural network (such as, the CNN) is, i.e., the more layers, the more parameters, the more difficult the training is, it easily leads to network non-convergence and occupation of storage resources. Moreover, the simpler the network structure is, i.e., the fewer layers, the fewer parameters, the calculation and analysis capabilities will be reduced, and the processing performance cannot be ensured. Experimental attempts have been made to find that, when the first sub CNN and the second sub CNN use three CNN layers, both the training effect and the processing performance of the network model can be ensured, and the balance therebetween is achieved.

Generally, the number of the convolution filters is 2 of integer power, such as 32, 64, and 128. The more the number of the filters is, the more complicated the network is, and the stronger the processing capability is, but the more requirements for the number of samples during network training are needed. In the embodiments of the disclosure, each CNN layer respectively includes 64 convolution filters, so that the requirements for the network processing performance, the complicity of the network structure and the number of the samples can be simultaneously satisfied.

In addition, the neural network (such as, the CNN) may further include a first pooling unit and a second pooling unit. In another embodiment based on the method for predicting walking behaviors shown in FIG. 3, after obtaining the walking behavior feature map by means of operation 302, the first pooling unit (i.e., a Max-Pooling layer) may further be utilized to perform maximum down-sampling on the walking behavior feature map to obtain a new walking behavior feature map. The new walking behavior feature map has a smaller space size than the walking behavior feature map.

Accordingly, after obtaining the second offset matrix by means of operation 306, the second pooling unit may further be utilized to perform convolution up-sampling on the second offset matrix to obtain a second offset matrix having the same size as the first offset matrix.

Exemplarily, the size of the first offset matrix as well as the space sizes of the position information map and the walking behavior feature map may be represented as X*Y; if an exemplary scale of the maximum down-sampling is, for example, 2, then the space size of the new walking behavior feature map is X/2*Y/2; accordingly, the scale of the convolution up-sampling is also 2, and the size of the second offset matrix obtained by convolution up-sampling is restored to X*Y.

By performing maximum down-sampling on the walking behavior feature map, the size of the walking behavior feature map can be decreased, so that the neural network (such as, the CNN) can process more walking behavior data. By performing convolution up-sampling after obtaining the second offset matrix, the size of the second offset matrix can be restored to be the same as that of the original space, so that the walking behavior output result finally obtained in the embodiments of the disclosure is consistent with an input walking behavior in space size.

Since the position information map is consistent with the walking behavior feature map in size, the position information map of the target scene and the walking behavior feature map can be added on the basis of a corresponding position. For example, the maximum up-sampling result of the walking behavior feature map is 1 2 3 4 5 6, and the position information map is 111111, and then addition result thereof is 1+1 2+1 3+1 4+1 5+1 6+1=2 3 4 5 6 7.

Figure 4:
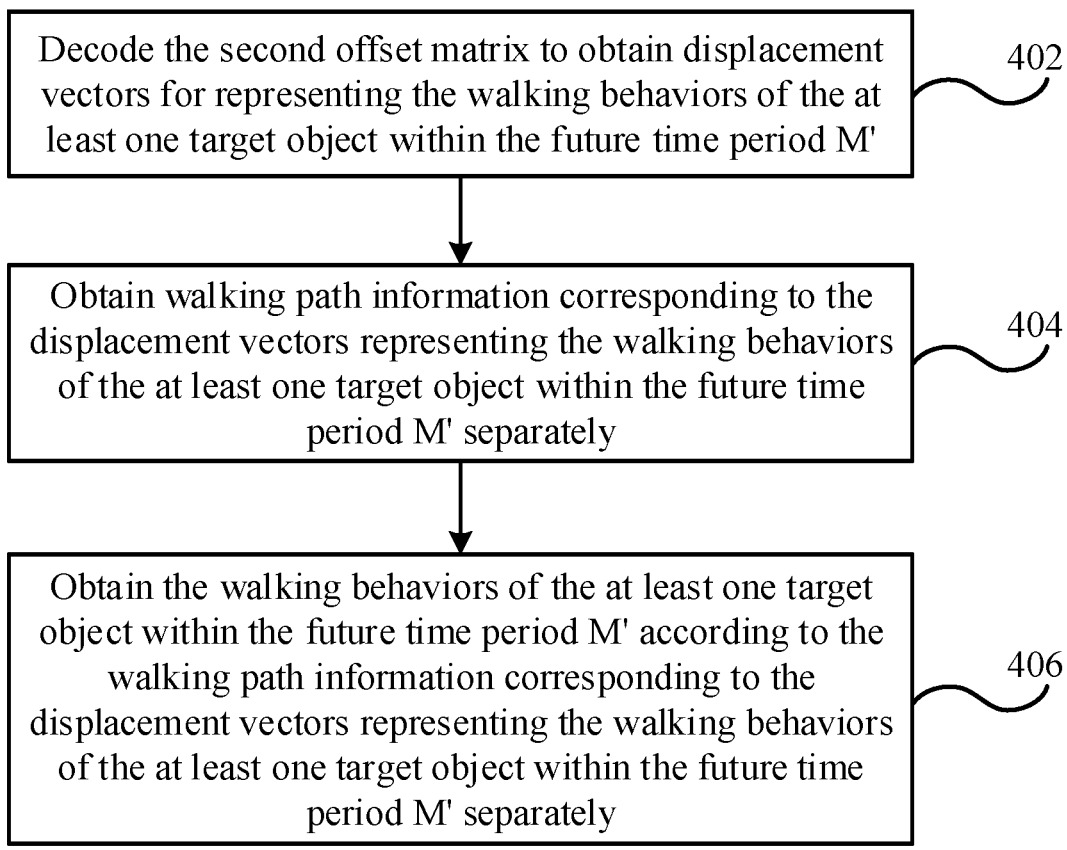
FIG. 4 illustrates a flow chart of an embodiment of obtaining walking behaviors of all target objects within a future time period M' according to the embodiment of the disclosure.

FIG. 4 is a flow chart of an embodiment of obtaining walking behaviors of all target objects within a future time period M' according to the embodiment of the disclosure. As shown in FIG. 4, in another specific example based on the embodiment of the method for predicting walking behaviors according to the disclosure, operation 106 may specifically be implemented as follows:

402. Decode the second offset matrix to obtain displacement vectors representing the walking behaviors of the at least one target object within the future time period M'.

404. Obtain walking path information corresponding to the displacement vectors representing the walking behaviors of the at least one target object within the future time period M' respectively.

406. Obtain the walking behaviors of the at least one target object within the future time period M' according to the walking path information corresponding to the displacement vectors of the walking behaviors of the at least one target object within the future time period M' respectively.

Figure 5A:
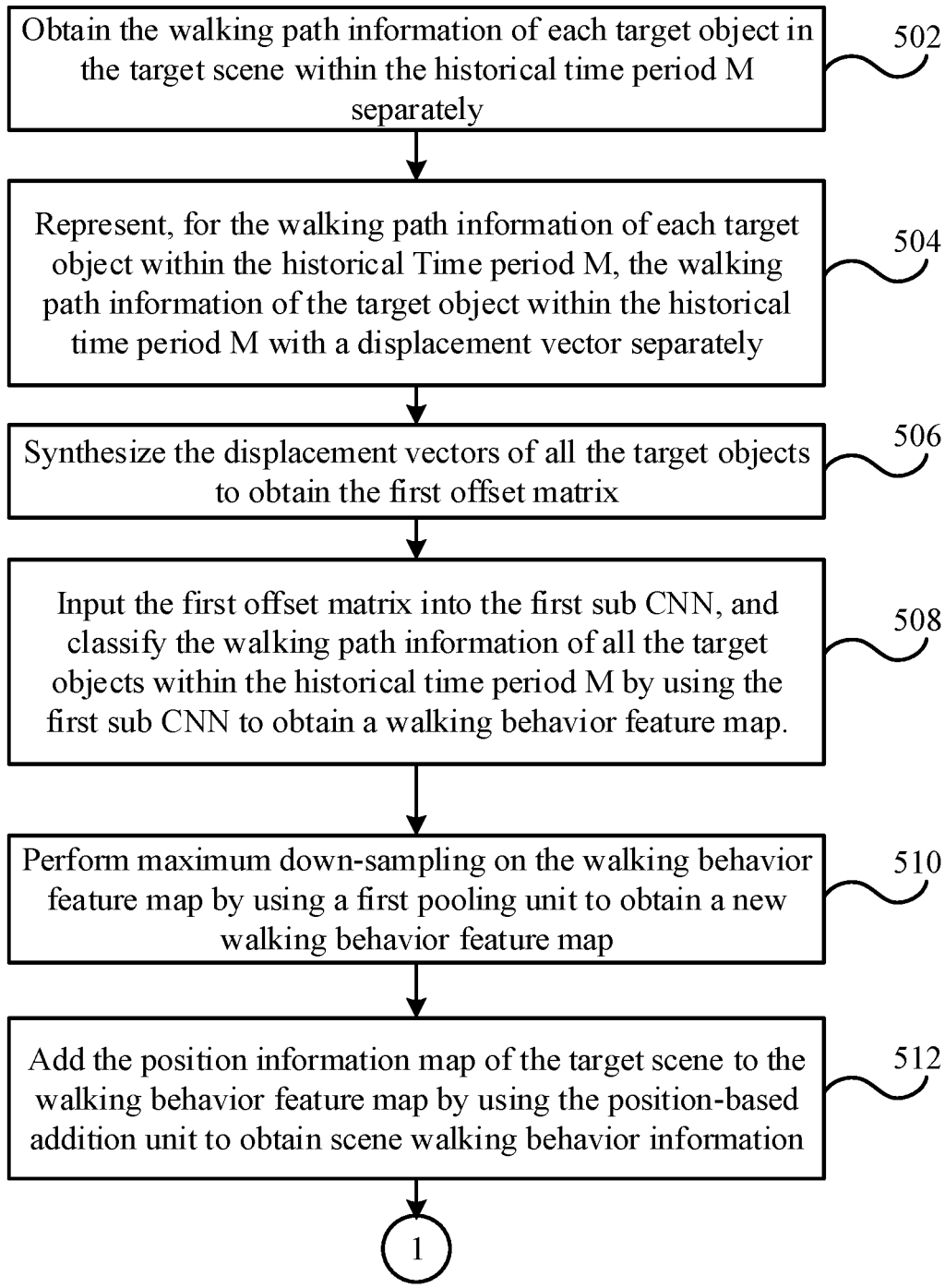
FIG. 5A illustrates a first portion of a flow chart of another embodiment of a method for predicting walking behaviors according to the disclosure.
Figure 5B:
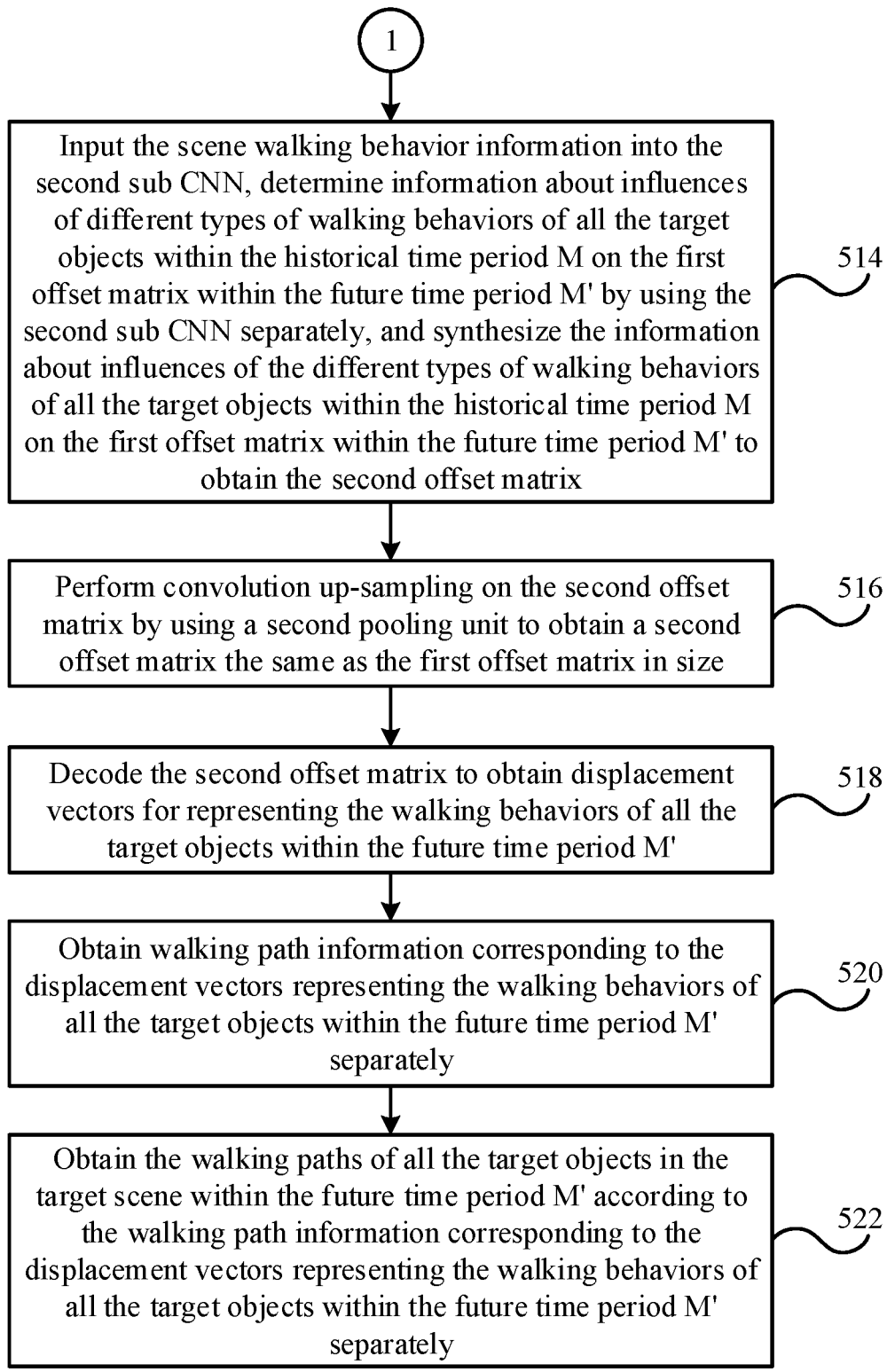
FIG. 5B illustrates a second portion of the flow chart of the other embodiment of a method for predicting walking behaviors according to the disclosure.

FIG. 5 is a flow chart of another embodiment of a method for predicting walking behaviors according to the disclosure. According to the embodiments of the disclosure, specific implementations of the embodiments above of the disclosure are further illustrated by taking a case where the target objects are pedestrians, the walking behavior information of all the target objects in the target scene within the historical time period M serves as the input of the first offset matrix, and the walking behavior information is the walking path information as an example. As shown in FIG. 5, the embodiment includes:

502. Obtain the walking behavior information of each target object in the target scene within the historical time period M respectively.

504. Represent, for the walking path information of each target object within the historical time period M, the walking path information of the target object within the historical time period M with a displacement vector respectively.

506. Synthesize the displacement vectors of all the target objects to obtain the first offset matrix.

508. Input the first offset matrix into the first sub CNN, and classify the walking path information of all the target objects within the historical time period M by using the first sub CNN to obtain a walking behavior feature map.

510. Perform maximum down-sampling on the walking behavior feature map by using the first pooling unit to obtain a new walking behavior feature map having a smaller space size than the walking behavior feature map.

512. Add a preset position information map of the target scene to the walking behavior feature map by using the position-based addition unit to obtain scene walking behavior information.

The position information map includes position information of a space structure in the target scene possibly having influences on the walking behaviors of the pedestrians.

514. Use the scene walking behavior information as the input of the second sub CNN, determine information about influences of different types of walking behaviors of all the target objects within the historical time period M on the first offset matrix within the future time period M' by using the second sub CNN respectively, and synthesize the information about influences of the different types of walking behaviors of all the target objects within the historical time period M on the first offset matrix within the future time period M' to obtain the second offset matrix.

516. Perform convolution up-sampling on the second offset matrix by using the second pooling unit to obtain a second offset matrix having the same size as the first offset matrix.

518. Decode the second offset matrix to obtain displacement vectors representing the walking behaviors of all the target objects within the future time period M'.

520. Obtain walking path information corresponding to the displacement vectors representing the walking behaviors of all the target objects within the future time period M' respectively.

522. Obtain the walking paths of all the target objects in the target scene within the future time period M' according to the walking path information corresponding to the displacement vectors representing the walking behaviors of all the target objects within the future time period M' respectively.

Furthermore, in another embodiment of the method for predicting walking behaviors according to the disclosure, the method may further include an operation of performing network training on an initial neural network (such as, an initial CNN) to obtain the neural network (such as, the CNN). The initial neural network (such as, the initial CNN) includes the following units: an initial first sub CNN, an initial second sub CNN, an initial first pooling unit, an initial second pooling unit, and an initial position-based addition unit.

In an specific example, iterative training can be performed on the initial first sub CNN, the initial second sub CNN, the initial first pooling unit, the initial second pooling unit, and the initial position-based addition unit in sequence; the interactive training is performed on the next unit when the training result of a current training unit meets a predetermined convergence condition.

The training result meeting a predetermined convergence condition may be, for example, when the deviation between the output result of the current training unit and a preset output result is less than a first preset threshold; and/or when the number of iterative trainings performed on the current training unit reaches a second preset threshold.

Figure 6:
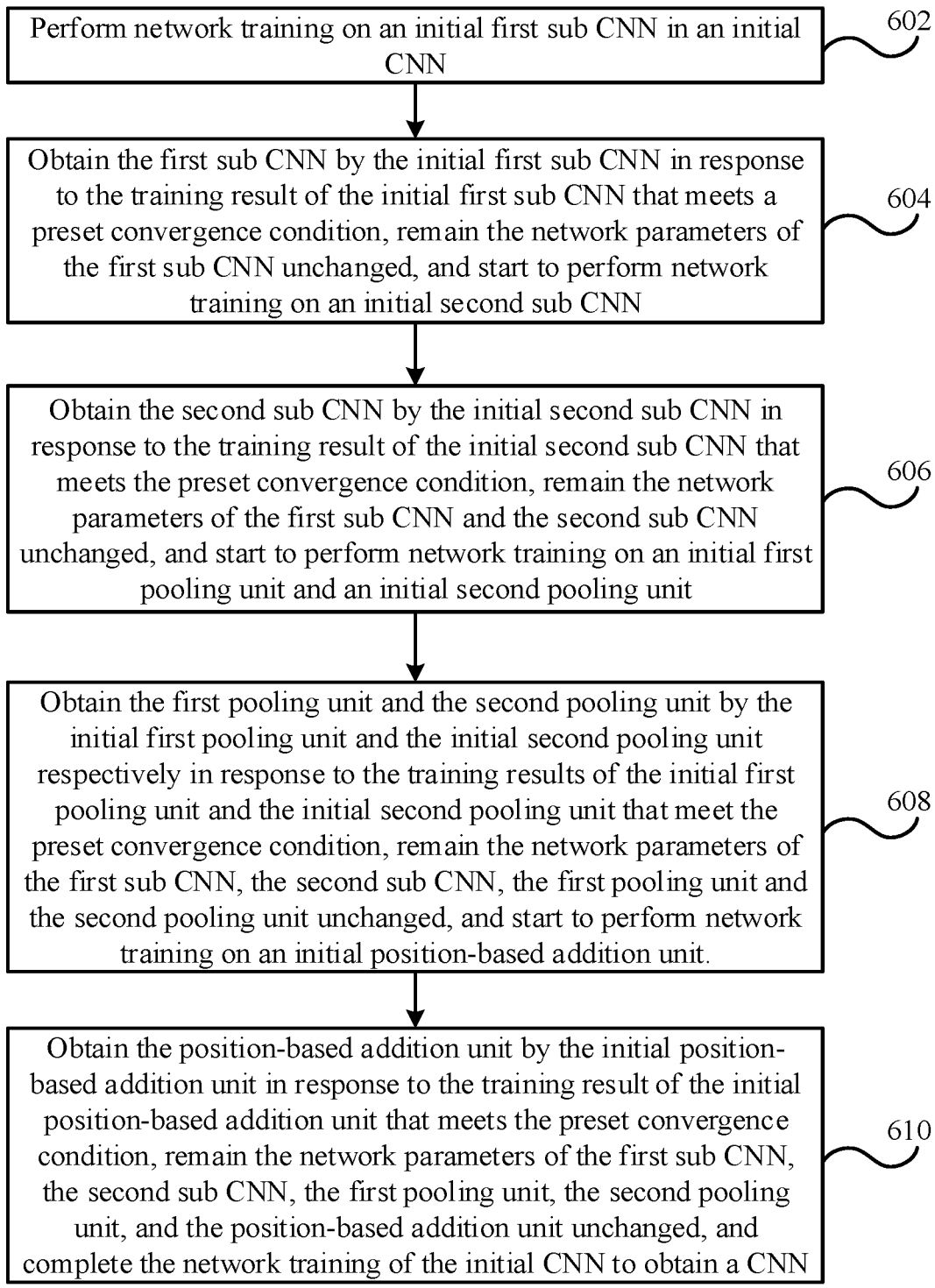
FIG. 6 illustrates a flow chart of an embodiment of training a neural network according to the embodiment of the disclosure.

FIG. 6 is a flow chart of an embodiment of training a neural network (such as, a CNN) according to the embodiment of the disclosure. As shown in FIG. 6, in the embodiment, network training is performed on the initial neural network (such as, the initial CNN) specifically as follows:

602. Perform network training on the initial first sub CNN in the initial CNN.

604. Obtain the first sub CNN by the initial first sub CNN in response to the training result of the initial first sub CNN meeting the preset convergence condition, remain the network parameters of the first sub CNN unchanged, and start to perform network training on the initial second sub CNN.

606. Obtain the second sub CNN by the initial second sub CNN in response to the training result of the initial second sub CNN that meets the preset convergence condition, remain the network parameters of the first sub CNN and the second sub CNN unchanged, and start to perform network training on the initial first pooling unit and the initial second pooling unit.

608. Obtain the first pooling unit and the second pooling unit by the initial first pooling unit and the initial second pooling unit respectively in response to the training results of the initial first pooling unit and the initial second pooling unit that meet the preset convergence condition, remain the network parameters of the first sub CNN, the second sub CNN, the first pooling unit and the second pooling unit unchanged, and start to perform network training on the initial position-based addition unit.

Because the first pooling unit decreases the size of the walking behavior feature map, the second pooling unit restores the input information as information the same as the original space in size, and the initial first pooling unit and the initial second pooling unit are simultaneously trained, it is ensured that the walking behavior output result finally obtained in the embodiments of the disclosure is consistent with an input walking behavior in space size.

610. Obtain the position-based addition unit by the initial position-based addition unit in response to the training result of the initial position-based addition unit that meets the preset convergence condition, remain the network parameters of the first sub CNN, the second sub CNN, the first pooling unit, the second pooling unit, and the position-based addition unit unchanged, and complete the network training of the initial neural network (such as, the initial CNN) to obtain the neural network (such as, the CNN).

By means of the embodiments above, the initial first sub CNN, the initial second sub CNN, the initial first pooling unit, the initial second pooling unit, and the initial position-based addition unit are trained in sequence, the network parameters of the trained network layers remain unchanged after each layer is converged, and the trainings of network layers in the next sequence are then initiated step by step. If the error rate of the training samples cannot be lowered further, it is indicated that the conditions have been converged, next training needs to be performed, and then the error rate can further be lowered, so that the training process is more stable and no damage is caused to the previously trained network structure after new network layers are added.

Persons skilled in the art could understand that: a part of or all of the steps for implementing the method embodiments above can be completed by hardware related to program instructions. The program may be stored in a non-transitory computer-readable storage medium. When the program is executed, the steps including the method embodiments above are executed. The storage medium includes various media capable of storing program codes, such as a Read-Only Memory (ROM), a Random-Access Memory (RAM), a magnetic disk, or an optical disk.

Figure 7:
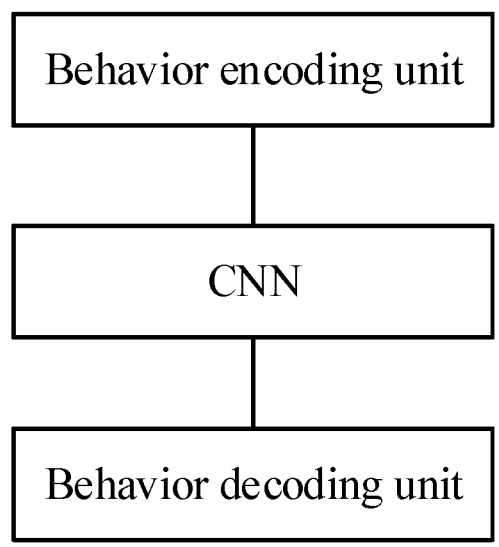
FIG. 7 illustrates a structural schematic diagram of an embodiment of an apparatus for predicting walking behaviors according to the disclosure.

FIG. 7 is a structural schematic diagram of an embodiment of an apparatus for predicting walking behaviors according to the disclosure. The apparatus according to the embodiment can be configured to implement the above embodiment of the method for predicting walking behaviors according to the disclosure. As shown in FIG. 7, the apparatus for predicting walking behaviors according to the embodiment includes: a behavior encoding unit, a neural network (such as, a CNN), and a behavior decoding unit.

The behavior encoding unit is configured to encode walking behavior information of at least one target object in a target scene within a historical time period M to obtain a first offset matrix representing the walking behavior information of the at least one target object within the historical time period M.

The target scene is a scene where a target object for which walking behavior prediction is required is located, such as a station and a factory. The at least one target object includes a target object for which walking behavior prediction is required. The target object for which walking behavior prediction is required may specifically be one or more. That is, according to the embodiments of the disclosure, the walking behaviors of multiple target objects within the future time period M' can be simultaneously predicted, walking behavior prediction tasks for the multiple target objects can be completed all at once. In addition, the at least one target object may include a part of or all of the target objects in the target scene. As a specific example rather than a limitation of the embodiments of the disclosure, the target objects in the embodiments of the disclosure specifically are pedestrians, and may also be all other objects or animals for which walking behavior prediction is required. The walking behavior information or walking behavior prediction information may, for example, include, but not limited to, any one or more of walking path information, walking direction information, and walking speed information. Exemplarily, the behavior encoding unit may specifically be configured to: obtain the walking behavior information of each target object in the target scene within the historical time period M respectively; represent, for the walking path information of each target object within the historical time period M, the walking behavior information of the target object within the historical time period M with a displacement vector respectively; and determine the first offset matrix according to the displacement vector of each target object.

A deep neural network is configured to receive the first offset matrix and output a second offset matrix representing the walking behavior information of the at least one target object within a future time period M'.

The behavior decoding unit is configured to decode the second offset matrix to obtain the walking behavior prediction information of the at least one target object within the future time period M'. The walking behavior prediction information may, for example, include, but not limited to, any one or more of walking path information, walking direction information, and walking speed information.

Exemplarily, the behavior decoding unit may specifically be configured to: decode the second offset matrix to obtain displacement vectors representing the walking behaviors of the at least one target object within the future time period M'; obtain walking behavior information corresponding to the displacement vectors representing the walking behaviors of the at least one target object within the future time period M' respectively; and obtain the walking behavior prediction information of the at least one target object within the future time period M' according to the walking behavior information corresponding to the displacement vectors representing the walking behaviors of the at least one target object within the future time period M' respectively.

On the basis of the apparatus for predicting walking behaviors provided by the embodiment of the disclosure above, walking behaviors of at least one target object in a target scene within a historical time period M are encoded to obtain a first offset matrix representing the walking behaviors of the at least one target object within the historical time period M, and the first offset matrix is input into a neural network (such as, a CNN) to obtain a second offset matrix representing walking behaviors of the at least one target object within a future time period M'. The second offset matrix is decoded to obtain the walking behaviors of the at least one target object within the future time period M'. The embodiments of the disclosure consider the influences of walking behaviors of target objects within a past period of time on the walking behaviors thereof within a future period of time. Because the walking behaviors of the target objects in the same scene may have influence on each other, the embodiments of the disclosure also consider the influences of the walking behaviors of other possible target objects (such as pedestrians) in the same scene on the walking behaviors of a particular target object (such as a current pedestrian for which prediction of future walking behaviors is required), so that the factors possibly having influences on the future walking behaviors of the particular target object can be simultaneously considered, and the walking behaviors of the target object within the future period of time can be more accurately and reliably predicted. In addition, according to the embodiments of the disclosure, the walking behaviors of at least one target object in a scene can be simultaneously analyzed, future walking trajectory prediction results of the at least one target object are given all at once, and the prediction is not limited only to walking behavior prediction on a single target object, and therefore, the prediction efficiency is high.

Figure 8:
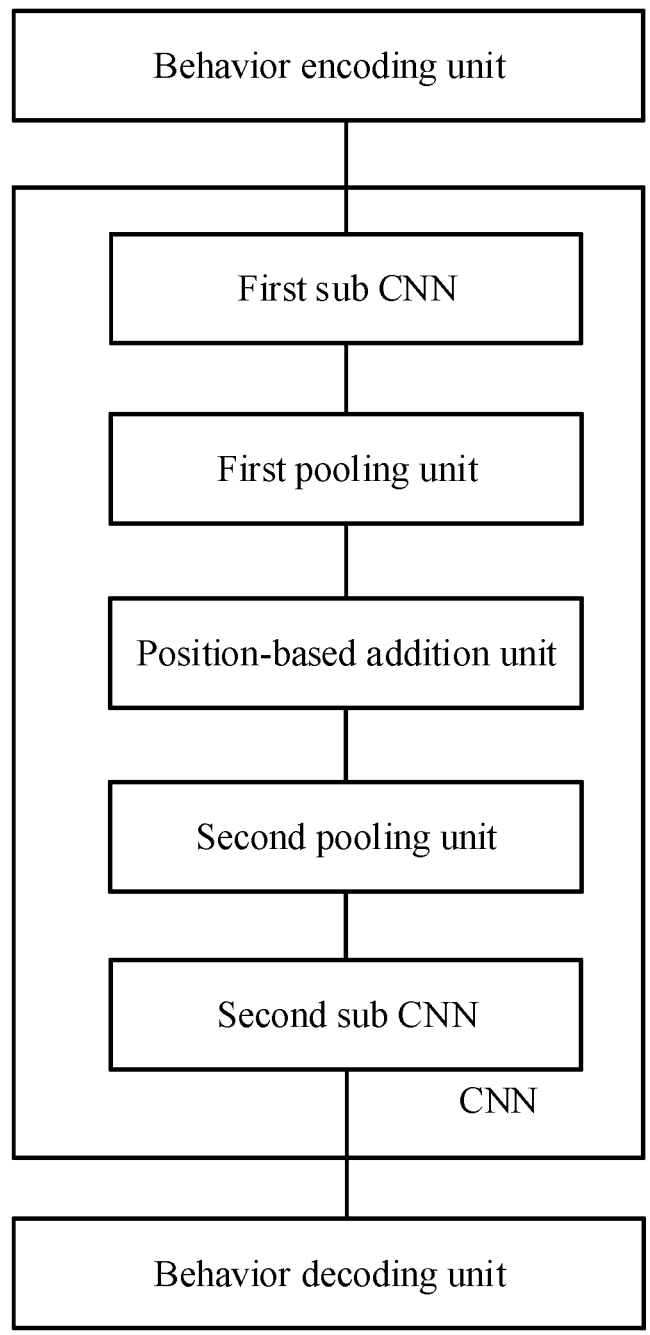
FIG. 8 illustrates a structural schematic diagram of another embodiment of an apparatus for predicting walking behaviors according to the disclosure.

FIG. 8 is a structural schematic diagram of another embodiment of an apparatus for predicting walking behaviors according to the disclosure. As shown in FIG. 8, compared with the embodiment shown in FIG. 7, the neural network (such as, the CNN) in this embodiment includes: a first sub CNN, a position-based addition unit, and a second sub CNN.

The first sub CNN is configured to receive the first offset matrix, and classify the walking behavior information of the at least one target object in the historical time period M to obtain a walking behavior feature map.

Exemplarily, the first sub CNN may specifically include multiple CNN layers, e.g., three CNN layers; each CNN layer in the multiple CNN layers of the first sub CNN may respectively include multiple convolution filters, e.g., 64 convolution filters; the size of each convolution filter may be 3*3.

The position-based addition unit is configured to add a preset position information map of the target scene with the walking behavior feature map on the basis of a corresponding position to obtain scene walking behavior information. The position information map includes position information of a space structure in the target scene. The space structure here may specifically be a space structure having influences on the walking behaviors of the target objects in the target scene, for example, position information of an entrance and an exit of the target scene and position information of obstacles in the target scene, and may also be all space structures in the target scene.

The second sub CNN is configured to receive the scene walking behavior information, determine information about influences of different types of walking behaviors of the at least one target object within the historical time period M on the first offset matrix within the future time period M' respectively, and determine the second offset matrix according to the information about influences.

Exemplarily, the second sub CNN may specifically include multiple CNN layers, e.g., three CNN layers; each CNN layer in the multiple CNN layers of the second sub CNN may respectively include multiple convolution filters, e.g., 64 convolution filters; the size of each convolution filter may be 3*3.

Furthermore, referring to FIG. 8 again, in another embodiment of the apparatus for predicting walking behaviors according to the disclosure, the neural network (such as, the CNN) may further include a first pooling unit and a second pooling unit.

The first pooling unit is configured to perform maximum down-sampling on the walking behavior feature map obtained by the first sub CNN to obtain a new walking behavior feature map having a smaller space size than the walking behavior feature map.

The second pooling unit is configured to perform, after the second sub CNN obtains the second offset matrix, convolution up-sampling on the second offset matrix to obtain a second offset matrix having the same size as the first offset matrix.

For example, the size of the first offset matrix as well as the space sizes of the position information map and the walking behavior feature map may be represented as X*Y. In a specific example, if the scale of the maximum down-sampling is 2, then the space size of the new walking behavior feature map is X/2*Y/2; the scale of the convolution up-sampling is 2, and the size of the second offset matrix obtained by convolution up-sampling is restored to X*Y.

Furthermore, in yet another embodiment of the apparatus for predicting walking behaviors according to the disclosure, the apparatus may further include a network training unit configured to perform network training on an initial neural network (such as, an initial CNN) to obtain the neural network (such as, the CNN). The initial neural network (such as, the initial CNN) includes the following units: an initial first sub CNN, an initial second sub CNN, an initial first pooling unit, an initial second pooling unit, and an initial position-based addition unit. In a specific example, the network training unit may specifically be configured to perform iterative training on the initial first sub CNN, the initial second sub CNN, the initial first pooling unit, the initial second pooling unit, and the initial position-based addition unit in sequence. The interactive training is performed on the next unit when the training result of a current training unit meets a predetermined convergence condition.

Further exemplarily, the network training unit may specifically be configured to perform network training on the initial neural network (such as, the initial CNN) by using the method shown in FIG. 6.

An embodiment of the disclosure also provides a data processing apparatus, including the apparatus for predicting walking behaviors provided by any embodiment above of the disclosure.

Specifically, the data processing apparatus according to the embodiments of the disclosure may be any apparatus having a data processing function, for example, including, but not limited to, an Advanced RISC Machine (ARM), a Central Processing Unit (CPU), or a Graphics Processing Unit (GPU), etc.

The data processing apparatus provided by the embodiment above of the disclosure includes the apparatus for predicting walking behaviors provided by any embodiment above of the disclosure, considers the influences of walking behaviors of target objects within a past period of time on the walking behaviors thereof within a future period of time, and also considers the influences of the walking behaviors of other possible target objects in the same scene on the walking behaviors of a particular target object. The at least one target object in the scene is simultaneously predicted, so that at least one factor possibly having influences on the future walking behaviors of the particular target object can be simultaneously considered, and the walking behaviors of a particular target object within the future period of time can be more accurately and reliably predicted. In addition, according to the embodiments of the disclosure, by simultaneously analyzing the walking behaviors of at least one target object in a scene, future walking trajectory prediction results of the at least one target object can be given all at once. Since the prediction is not performed on the basis of a single target object, the prediction efficiency is high, and the walking behavior prediction tasks for multiple target objects can be completed all at once.

In addition, an embodiment of the disclosure also provides an electronic device that may be, for example, a mobile terminal, a Personal Computer (PC), a tablet computer, a server, and the like. The electronic device is provided with the data processing apparatus according to any embodiment above of the disclosure.

The electronic device provided by the embodiment above of the disclosure includes the data processing apparatus and thus includes the apparatus for predicting walking behaviors provided by any embodiment above of the disclosure, considers the influences of walking behaviors of target objects within a past period of time on the walking behaviors thereof within a future period of time, and also considers the influences of the walking behaviors of other possible target objects in the same scene on the walking behaviors of a particular target object. The at least one target object in the scene is simultaneously predicted, so that at least one factor possibly having influences on the future walking behaviors of the particular target object can be simultaneously considered, and the walking behaviors of a particular target object within the future period of time can be more accurately and reliably predicted. In addition, according to the embodiments of the disclosure, by simultaneously analyzing the walking behaviors of at least one target object in a scene, future walking trajectory prediction results of the at least one target object can be given all at once. Since the prediction is not performed on the basis of a single target object, the prediction efficiency is high, and the walking behavior prediction tasks for multiple target objects can be completed all at once.

Figure 9:
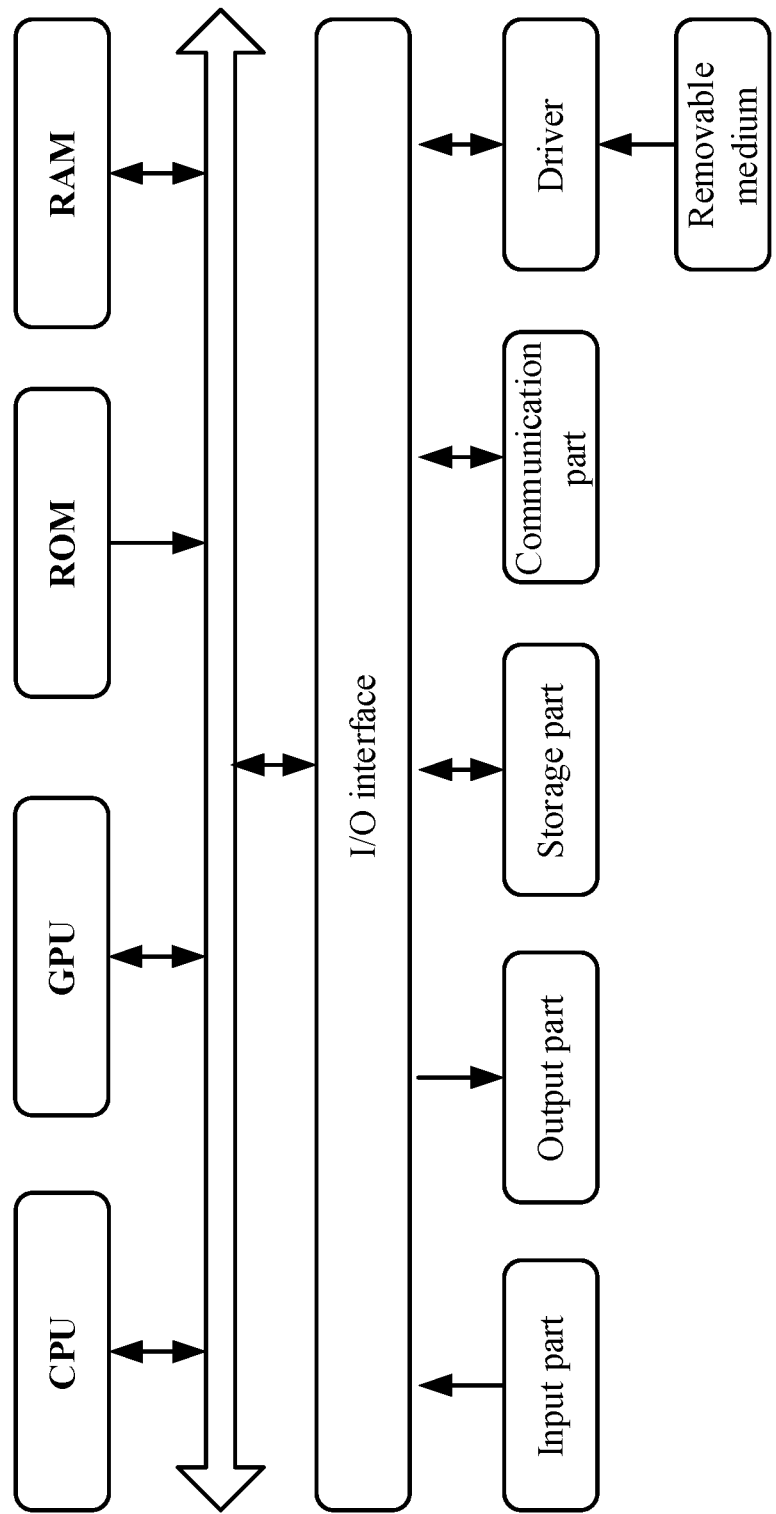
FIG. 9 illustrates a structural schematic diagram of an application embodiment of an electronic device according to the disclosure.

FIG. 9 is a structural schematic diagram of an application embodiment of an electronic device according to the disclosure. As shown in FIG. 9, the electronic device configured to implement the embodiments of the disclosure includes a CPU or a GPU, which can execute appropriate actions and processing according to executable instructions stored in an ROM or executable instructions loaded from a storage part into an RAM. The CPU or the GPU may communicate with the ROM and/or the RAM to execute the executable instructions so as to complete operations corresponding to the method for predicting walking behaviors provided by the embodiments of the disclosure, for example: encoding walking behavior information of at least one target object in a target scene within a historical time period M to obtain a first offset matrix representing the walking behavior information of the at least one target object within the historical time period M; inputting the first offset matrix into a deep neural network (such as, a CNN), so that the neural network (such as, the CNN) outputs a second offset matrix representing walking behavior information of the at least one target object within a future time period M'; and decoding the second offset matrix to obtain walking behavior prediction information of the at least one target object within the future time period M'.

In addition, the RAM may also store various programs and data required by operations of the system. The CPU, GPU, ROM and RAM are connected to each other by means of a bus. An Input/Output (I/O) interface is also connected to the bus.

The following components are connected to the I/O interface: an input part including a keyboard, a mouse, etc.; an output part including a Cathode Ray Tube (CRT), a Liquid Crystal Display (LCD), a speaker, etc.; a storage part including a hard disk drive, etc.; and a communication part including a network interface card, such as a LAN card and a modem. The communication part performs communication processing via a network, such as the Internet. A driver is also connected to the I/O interface as needed. A removable medium, such as a magnetic disk, an optical disk, a magneto-optical disk, and a semiconductor memory, is installed on the driver as needed, so that a computer program read therefrom is installed in the storage part as needed.

Particularly, according to the embodiments of the disclosure, the processes described above with reference to the flow chart may be implemented as a computer software program. For example, an embodiment of the disclosure includes a computer program product, which includes a computer program that is tangibly embedded in a machine-readable medium. The computer program includes program codes configured to execute the method shown in the flow chart. The computer program may include corresponding instructions for correspondingly executing the steps of the method for predicting any walking behavior provided by the embodiment of the disclosure, such as, an instruction for encoding walking behavior information of at least one target object in a target scene within a historical time period M to obtain a first offset matrix representing the walking behavior information of the at least one target object within the historical time period M; an instruction for inputting the first offset matrix into a deep neural network (such as, a CNN), so that the deep neural network (such as, the CNN) outputs a second offset matrix representing walking behavior information of the at least one target object within a future time period M'; and an instruction for decoding the second offset matrix to obtain walking behavior prediction information of the at least one target object within the future time period M'. The computer program may be downloaded and installed from a network by means of the communication part, and/or may be installed from the removable medium. When the computer program is executed by the CPU or the GPU, the functions above defined in the method according to the disclosure are executed.

An embodiment of the disclosure further provides a computer storage medium for storing computer-readable instructions. The instructions include: an instruction for encoding walking behavior information of at least one target object in a target scene within a historical time period M to obtain a first offset matrix representing the walking behavior information of the at least one target object within the historical time period M; an instruction for inputting the first offset matrix into a deep neural network (such as, a CNN), so that the deep neural network (such as, the CNN) outputs a second offset matrix representing walking behavior information of the at least one target object within a future time period M'; and an instruction for decoding the second offset matrix to obtain walking behavior prediction information of the at least one target object within the future time period M'.

In addition, an embodiment of the disclosure also provides a computer device, including:

a memory for storing executable instructions; and one or more processors communicating with the memory to execute the executable instructions, so as to complete operations corresponding to the method for predicting walking behaviors in any one of the embodiments of the disclosure above.

The technical solution of predicting walking behaviors according to the embodiments of the disclosure may be, for example, applied to, but not limited to, the following one or more scenes:

(1) The technical solution may be applied to a scene under video monitoring to predict future walking behaviors of all pedestrians;

(2) The walking behavior prediction result according to the embodiments of the disclosure may be used as the input of A neural network (such as, a CNN) to predict the walking behaviors of all the pedestrians in a target scene within a longer period of time;

Specifically, the procedures of the embodiment of the method for predicting walking behaviors according to the disclosure may be iterated, the output walking behavior prediction information within a future time period M' is further encoded and then is input to the neural network (such as, the CNN), and afterwards, a second offset matrix is decoded and output, so that the prediction result of pedestrian's walking behaviors after a longer period of time can be obtained;

(3) The walking behavior prediction result according to the embodiments of the disclosure can be utilized to estimate position information of all the pedestrians in the target scene after a period of time;

(4) The position information of all the pedestrians in the target scene after a period of time can be utilized to correct an error occurring in a tracking algorithm to aid in obtaining a better tracking result;

Specifically, in most tracking algorithms with low credibility, future pedestrians are found by matching based on the appearance information of the pedestrians. The tracking algorithms always mistakenly link the walking trajectory of pedestrian A within a past period of time with the trajectory of pedestrian B within a future period of time. By means of the prediction of a pedestrian's walking path according to the embodiments of the disclosure, the appearance and the prediction result of the walking path of the pedestrian can be comprehensively considered, so that the result is more accurate. When the credibility of the result of the tracking algorithm is not high, the prediction information of the pedestrian's walking trajectory is can be utilized to aid in finding the pedestrian currently needing to be tracked.

(5) The disclosure can be utilized to detect some abnormal behaviors occurring in the scene.

The embodiments of the disclosure can predict, according to walking routes of pedestrians in a target scene within a past period of time, future walking routes and destinations of these pedestrians. When it is found that the true walking route of a pedestrian does not conform to the redirection result, or the destination of this pedestrian is dramatically inconsistent with the predicted destination, it is indicated that the walking behavior of this pedestrian has gone beyond expectations, and it can be deduced that this pedestrian conducts an abnormal behavior, such as, sudden turning, sudden accelerative running, or sudden stop.

The embodiments of the disclosure have the following beneficial technical effects:

To be able to apply a deep learning framework to pedestrian's behavior modeling, we put forward a behavior encoding concept. By means of behavior encoding, pedestrian's behavior information can be unambiguously encoded into the input/output of a deep neural network. This encoding approach can be easily expanded to other fields;

By using a deep learning technology, the pedestrian's walking behavior prediction result is more accurate, and various influence factors can better be comprehensively analyzed;

In addition, many existing methods can predict pedestrian's behaviors of a single target only, while the embodiments of the disclosure can simultaneously predict and analyze walking behaviors of at least one pedestrian or even all pedestrians in a target scene.

The embodiments of the present description are all described in a progressive manner, and each embodiment focuses on illustrating the difference from one another. For the same and similar parts among the embodiments, reference may be made to each other. The description of the system, apparatus, and device embodiments is relatively simple because they are basically similar to the method embodiments, and reference may be made to part of the description in the method embodiments for relevant description.

The method, system, apparatus and device of the disclosure may be implemented in many ways. For example, the method, system, apparatus and device of the disclosure may be implemented by means of software, hardware, firmware or any combination of software, hardware and firmware. The sequence of steps configured for the method is provided for an illustrative purpose only. The steps of the method according to the disclosure are not limited to the specific sequence as described above, unless otherwise specifically stated. In addition, in some embodiments, the disclosure may also be embodied as programs recorded in a recording medium, including machine-readable instructions for implementing the method according to the disclosure. Therefore, the disclosure also covers the recording medium that stores the program for performing the method according to the disclosure.

The description of the disclosure is provided for illustrative and descriptive purposes, rather than being exhaustive or limiting the disclosure thereto. Many modifications and variations are obvious to persons skilled in the art. The embodiments are selected and described such that principles and practical applications of the disclosure can be better explained and persons skilled in the art could understand the disclosure to design a variety of embodiments with various modifications suitable for particular purposes.

The invention claimed is:

1. A method for predicting walking behaviors, comprising:
   capturing at least one or more images of at least one target object in a target scene to obtain walking behavior information of the at least one target object;
   encoding the walking behavior information within a historical time period M to obtain first offset information, the first offset information representing the walking behavior information of the at least one target object within the historical time period M;
   inputting the first offset information into a neural network, and outputting by the neural network second offset information representing walking behavior information of the at least one target object within a future time period M'; and
   decoding the second offset information to obtain walking behavior prediction information of the at least one target object within the future time period M';
   outputting predicted position information of the at least one target object based on the walking behavior prediction information.

2. The method according to claim 1, wherein the walking behavior information or the walking behavior prediction information comprises any one or more of walking path information, walking direction information, and walking speed information.

3. The method according to claim 1, wherein the step of encoding walking behavior information of at least one target object in a target scene within a historical time period M to obtain first offset information comprises:
   obtaining the walking behavior information of each target object in the target scene within the historical time period M respectively;
   representing, for the walking behavior information of each target object within the historical time period M, the walking behavior information of the target object within the historical time period M with a displacement vector respectively; and
   determining a first offset matrix serving as the first offset information according to the displacement vector of each target object.

4. The method according to claim 1, wherein the neural network comprises a first sub Convolutional Neural Network (CNN), a position-based addition unit, and a second sub CNN;

the step of inputting the first offset information into a neural network and outputting by the neural network second offset information comprises:

using the first offset matrix serving as the first offset information as an input of the first sub CNN, and classifying the walking behavior information of the at least one target object within the historical time period M by using the first sub CNN to obtain a walking behavior feature map;

adding a preset position information map of the target scene to the walking behavior feature map by using the position-based addition unit on the basis of a corresponding position to obtain scene walking behavior information, the position information map comprising position information of a space structure in the target scene; and using the scene walking behavior information as an input of the second sub CNN, determining information about influences of different types of walking behaviors of the at least one target object within the historical time period M on the first offset matrix within the future time period M' by using the second sub CNN respectively, and determining a second offset matrix serving as the second offset information according to the information about influences.

5. The method according to claim 4, further comprising:
pre-determining the position information map of the target scene according to information of the space structure of the target scene.

6. The method according to claim 4, wherein the first sub CNN comprises multiple cascaded CNN layers; each CNN layer in the first sub CNN respectively comprises multiple convolution filters; and/or the second sub CNN comprises multiple cascaded CNN layers, and each CNN layer in the second sub CNN respectively comprises multiple convolution filters.

7. The method according to claim 4, wherein the neural network further comprises a first pooling unit and a second pooling unit;

the method further comprises: after the step of obtaining the walking behavior feature map, performing maximum down-sampling on the walking behavior feature map by using the first pooling unit to obtain a new walking behavior feature map, the new walking behavior feature map having a smaller space size than the walking behavior feature map;

the method further comprises: after the step of obtaining the second offset matrix, performing convolution up-sampling on the second offset matrix by using the second pooling unit to obtain a second offset matrix having the same size as the first offset matrix.

8. The method according to claim 1, wherein the step of decoding the second offset information to obtain walking behavior prediction information of the at least one target object within the future time period M' comprises:

decoding the second offset information to obtain displacement vectors representing the walking behaviors of the at least one target object within the future time period M';

obtaining walking behavior information corresponding to the displacement vectors representing the walking behaviors of the at least one target object within the future time period M' respectively; and obtaining prediction information of the walking behaviors of the at least one target object within the future time period M' according to the walking behavior information corresponding to the displacement vectors of the walking behaviors of the at least one target object within the future time period M' respectively.

9. The method according to claim 7, further comprising:
performing network training on an initial neural network in advance to obtain the neural network, the initial neural network comprising: an initial first sub CNN, an initial second sub CNN, an initial first pooling unit, an initial second pooling unit, and an initial position-based addition unit.

10. The method according to claim 9, wherein the step of performing network training on an initial neural network in advance to obtain the neural network comprises:

performing iterative training on the initial first sub CNN, the initial second sub CNN, the initial first pooling unit, the initial second pooling unit and the initial position-based addition unit in sequence, the interactive training being performed on the next unit when a training result of a current training unit meets a predetermined convergence condition.

11. An apparatus for predicting walking behaviors, comprising:

a processor;

memory having stored instructions and a neural network, the instructions when executed by the processor, cause the processor to perform operations, the operations comprising capturing at least one or more images of at least one target object in a target scene to obtain walking behavior information of the at least one target object;

encoding walking behavior information of at least one target object in a target scene within a historical time period M to obtain first offset information representing the walking behavior information of the at least one target object within the historical time period M;

inputting the first offset information into the neural network and outputting by the neural network second offset information representing the walking behavior information of the at least one target object within a future time period M';

decoding the second offset information to obtain walking behavior prediction information of the at least one target object within the future time period M'; and outputting predicted position information of the at least one target object based on the walking behavior prediction information.

12. The apparatus according to claim 11, wherein the walking behavior information or the walking behavior prediction information comprises any one or more of walking path information, walking direction information, and walking speed information.

13. The apparatus according to claim 11, wherein the operation of encoding walking behavior information of at least one target object in a target scene within a historical time period M to obtain first offset information comprises:

obtaining the walking behavior information of each target object in the target scene within the historical time period M respectively;

representing, for the walking behavior information of each target object within the historical time period M, the walking behavior information of the target object within the historical time period M with a displacement vector respectively; and determining a first offset matrix serving as the first offset information according to the displacement vector of each target object.

14. The apparatus according to claim 11, wherein the neural network comprises:
    a first sub CNN, configured to receive the first offset matrix serving as the first offset information, and classify the walking behavior information of the at least one target object within the historical time period M to obtain a walking behavior feature map;
    a position-based addition unit, configured to add a preset position information map of the target scene to the walking behavior feature map on the basis of a corresponding position to obtain scene walking behavior information, the position information map comprising position information of a space structure in the target scene; and
    a second sub CNN, configured to receive the scene walking behavior information, determine information about influences of different types of walking behaviors of the at least one target object within the historical time period M on the first offset matrix within the future time period M' respectively, and determine a second offset matrix serving as the second offset information according to the information about influences.

15. The apparatus according to claim 14, wherein the first sub CNN comprises multiple cascaded CNN layers, each CNN layer in the first sub CNN respectively comprises multiple convolution filters; and/or
    the second sub CNN comprises multiple cascaded CNN layers; each CNN layer in the second sub CNN respectively comprises multiple convolution filters.

16. The apparatus according to claim 14, wherein the neural network further comprises:
    a first pooling unit, configured to perform maximum down-sampling on the walking behavior feature map obtained by the first sub CNN to obtain a new walking behavior feature map having a smaller space size than the walking behavior feature map; and
    a second pooling unit, configured to perform, after the second sub CNN obtains the second offset matrix, convolution up-sampling on the second offset matrix to obtain a second offset matrix having the same size as the first offset matrix.

17. The apparatus according to claim 11,
wherein the operation of decoding the second offset information to obtain walking behavior prediction information of the at least one target object within the future time period M' comprises:
    decoding the second offset information to obtain displacement vectors representing the walking behaviors of the at least one target object within the future time period M';
    obtaining walking behavior information corresponding to the displacement vectors representing the walking behaviors of the at least one target object within the future time period M' respectively; and
    obtaining prediction information of the walking behaviors of the at least one target object within the future time period M' according to the walking behavior information corresponding to the displacement vectors of the walking behaviors of the at least one target object within the future time period M' respectively.

18. The apparatus according to claim 16, the operations further comprising:
    performing network training on an initial neural network in advance to obtain the neural network, the initial neural network comprising: an initial first sub CNN, an initial second sub CNN, an initial first pooling unit, an initial second pooling unit, and an initial position-based addition unit.

19. The apparatus according to claim 18, wherein the operation of performing network training on an initial neural network in advance to obtain the neural network comprises: performing iterative training on the initial first sub CNN, the initial second sub CNN, the initial first pooling unit, the initial second pooling unit and the initial position-based addition unit in sequence, the interactive training being performed on the next unit when a training result of a current training unit meets a predetermined convergence condition.

20. A non-transitory computer-readable storage medium having stored thereon instructions executable by a processor, wherein the instructions, when being executed, are configured to:
    capture at least one or more images of at least one target object in a target scene to obtain walking behavior information of the at least one target object;
    encode walking behavior information of at least one target object in a target scene within a historical time period M to obtain first offset information, the first offset information representing the walking behavior information of the at least one target object within the historical time period M;
    input the first offset information into a neural network, and outputting by the neural network second offset information representing walking behavior information of the at least one target object within a future time period M';
    decode the second offset information to obtain walking behavior prediction information of the at least one target object within the future time period M'; and
    output predicted position information of the at least one target object based on the walking behavior prediction information.

* * * * *